Oct. 23, 1951  F. C. KING  2,572,354
FISHING REEL
Filed June 29, 1949  2 SHEETS—SHEET 1
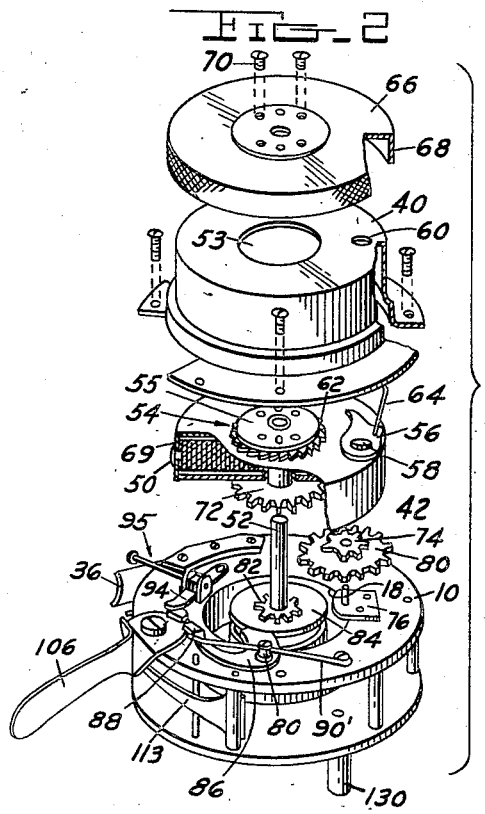
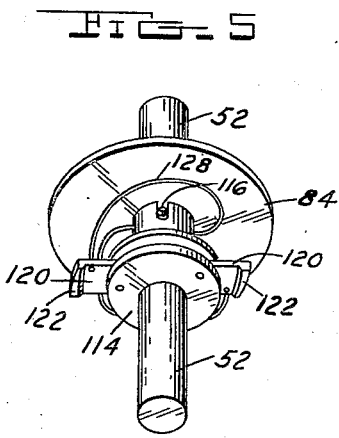
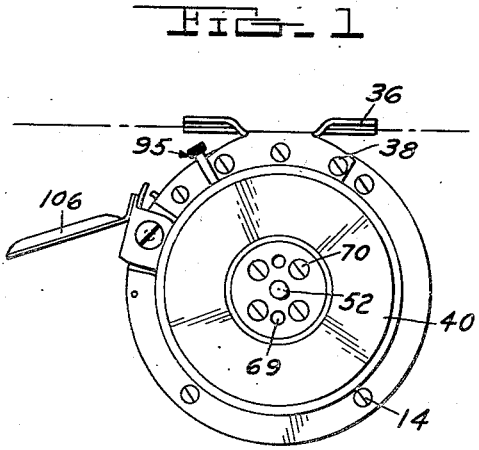
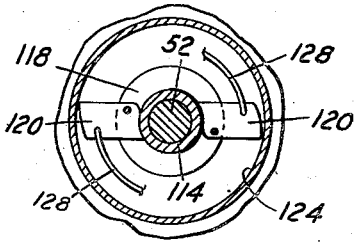
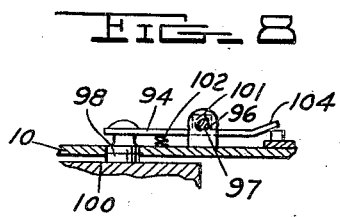
INVENTOR.
FLOYD C. KING
BY
Barnes, Kisselle, Laughlin & Raisch
ATTORNEYS Oct. 23, 1951 F. C. KING 2,572,354
FISHING REEL
Filed June 29, 1949 2 SHEETS—SHEET 2
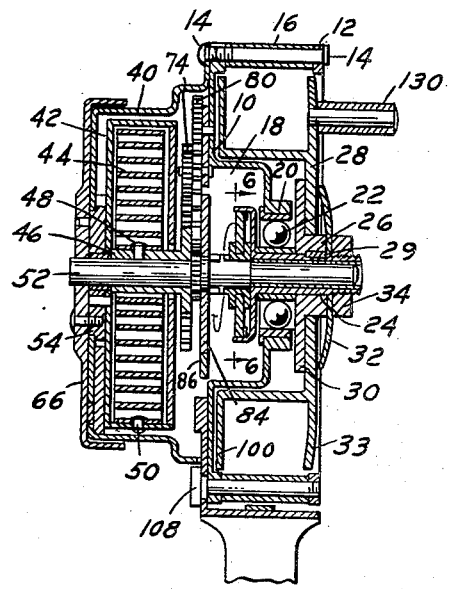
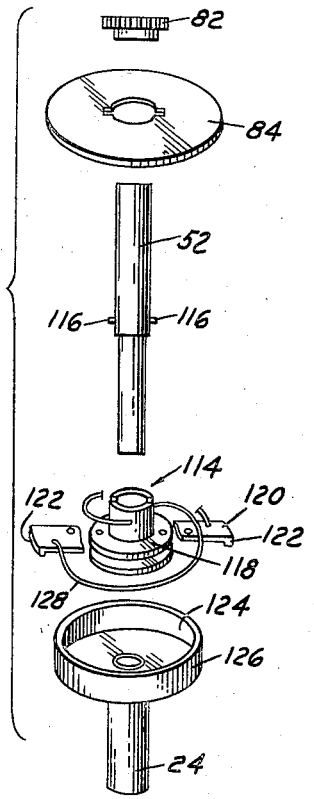
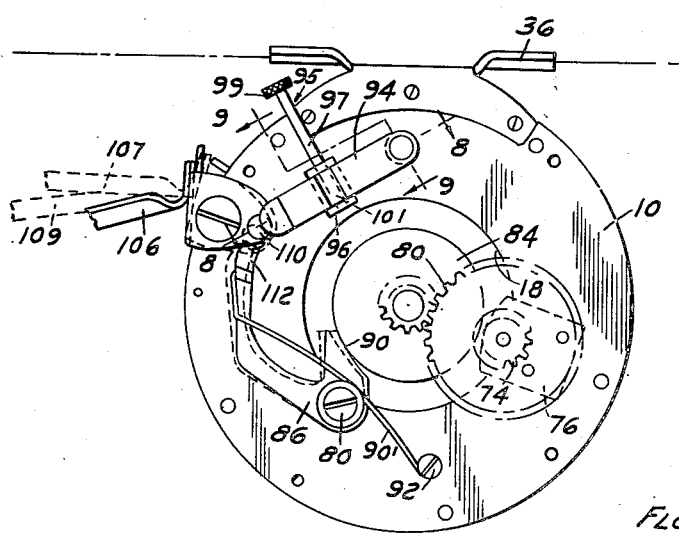
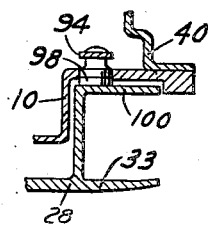
INVENTOR.
FLOYD C. KING
BY
Barnes, Kisselle, Laughlin & Raisch
ATTORNEYS Patented Oct. 23, 1951

2,572,354

UNITED STATES PATENT OFFICE 2,572,354

FISHING REEL

Floyd C. King, Walled Lake, Mich.

Application June 29, 1949, Serial No. 102,091

4 Claims. (Cl. 242—84.3)

1

This invention relates to a fishing reel and more particularly to a fly casting reel of the automatic type; that is, a reel which can be wound manually or automatically by means of a spiral spring.

It is an object of this invention to provide a fishing reel which is constructed so as to be capable of being manufactured economically and which can be assembled and disassembled very readily.

Another object of the invention is to provide a fishing reel in which the line spool is automatically connected with the spring driven motor whenever the spring is released in the wound condition and automatically disconnected from the spring drive whenever a brake is applied to the spring motor so that a single brake lever may be employed to control the operation of both the spring motor and the clutch for the spool.

Another object of the invention resides in the provision of a self actuating clutch together with a brake member which operates directly on the drive shaft of the spring motor so that a free running spool may be provided regardless of whether the spring motor is in the wound or unwound condition.

A further object of the invention resides in the provision of two braking members, one for the line spool, and one for the main drive shaft and a single lever shiftable between extreme positions to release the spool brake and then the brake on the drive shaft.

Still another object of the invention is to provide a novel spring motor construction for the reel.

A further object of the invention resides in the provision of a centrifugally operated clutch for connecting the driving shaft of the spring motor with the driven shaft on which the line spool is mounted so that when the spring motor is released the clutch automatically connects the line spool in a driving relation with the motor.

In the drawings:

Figure 1 is a side elevation of the fishing reel of my invention.

Figure 2 is an exploded perspective view of the reel.

Figure 3 is a cross sectional view of the reel.

Figure 4 is an exploded perspective view of the main shaft with the brake disc and clutch assembly.

Figure 5 is a perspective view of the main shaft with the braking disc and clutch assembly mounted thereon.

Figure 6 is a sectional view of the clutch taken substantially along the lines 6—6 in Figure 3.

2

Figure 7 is a side view of the reel with the spring cover removed showing the dual braking arrangement for the spool and the main shaft of the reel.

Figure 8 is a sectional view taken substantially along the lines 8—8 in Figure 7.

Figure 9 is a sectional view taken substantially along the lines 9—9 in Figure 7.

As is shown in the drawings, the reel has a main supporting frame 10 to which is connected in spaced relation an outer end plate 12 in the form of a ring member. Plate 12 is secured to frame 10 by means of screws 14 and spacer sleeves 16. Frame 10 is shaped to provide a concavity 18 and has a central bearing hub 20 into which is press fitted a roller bearing 22 which rotatably supports an outer shaft 24. Hub 26 is keyed to shaft 24 as at 29. The outer surface of hub 26 forms a bearing for the line winding spool 28. Spool 28 fits over hub 26 with a slip fit and is yieldably maintained against a radial flange 30 at the inner end of hub 26 by means of a dished spring washer 32 which is arranged to bear against the outer wall 33 of the spool with a variable pressure by means of a nut 34 threaded over the end of shaft 24. It will be seen that by loosening and tightening nut 34 the frictional drag on the spool and thereby the degree of slipping of the spool on hub 26 can be controlled to a desired amount. Nut 34 is preferably adjusted so that the frictional drag of the spool is just below the breaking strength of the line on the spool. If a fish attempts to exert a tension on the line greater than the strength of the line, the spool simply slips in hub 26 and permits the line to be unwound by the fish.

The reel is adapted to be secured onto a fishing pole by means of a saddle 36 which is secured to frame 10 and end plate 12 as by screws 38. Frame 10 also supports a spring assembly cover 40. Within cover 40 there is arranged a spring casing 42 which encloses a spiral spring 44, the inner end of which is secured to a sleeve 46 as by a rivet 48. The outer end of spring 44 is riveted to the spring casing 42 as at 50. Sleeve 46 is rotatably supported relative to casing 42 on a main shaft 52 which forms the driving shaft for the reel. A ratchet wheel 54 is riveted or otherwise affixed to the outer face of casing 42 at the center thereof, wheel 54 having a central aperture through which main shaft 52 extends. A pawl 56 is pivoted on cover 40 by means of a cylindrical boss 58 on the pawl which is received by a hole 60 on cover 40. Pawl 56 is biased into engagement with the teeth 62 of ratchet wheel 54 by a spring 64 which is secured at one end to the pawl with its free end acting against the peripheral wall of cover 40. As is shown in Figure 2 pawl 56 and ratchet wheel 54 are arranged to permit rotation of the spring casing 42 in a counter clockwise direction within cover 40 and prevent rotation of the casing in a clockwise direction. Spring casing 42 is arranged to be rotated manually so as to wind spring 44 by means of a cap 66 which has a knurled peripheral flange 68 overlying the cylindrical portion of cover 40. Cap 66 is mounted on spring casing 42, but on the outside of cover 40 by means of dowels 69 and screws 70 which thread into ratchet wheel 54. A large aperture 53 in cover 40 accommodates the raised face 55 of wheel 54 so as to permit cap 66 to be secured firmly to casing 42 exteriorly of cover 40.

Sleeve 46, on which the inner end of spring 44 is riveted, is provided at the inner end thereof with a gear 72 which is rigidly mounted thereon. Gear 72 meshes with a smaller spur gear 74 which is rotatably supported on frame 10 as by means of a bearing plate 76 having a stud 78 mounted thereon which receives the gear. Spur gear 74 is fixed concentrically on a larger gear 80 which meshes with a small gear 82 keyed to main shaft 52. This gear train it will be seen serves to rotate main shaft 52 at a relatively high speed when the tension on spring 44 is released.

In order to hold main shaft 52 and consequently sleeve 46 from turning when the spring is wound, as by rotating cap 66, there is provided a novel brake arrangement which includes a braking disc 84 which is keyed to the small driving gear 82 on the main shaft. A braking arm 86, pivoted on frame 10 as by a post 80, is fashioned with an arcuate braking surface 90 which in braking position engages the peripheral edge of braking disc 84 to hold the main shaft against rotation. Brake arm 86 is normally biased into braking engagement with disc 84 by means of a spring 90' which is anchored on frame 10 as at 92 and flexed around post 80 with its free end engaged over a lug 88 at the end of arm 86. As is best shown in Figure 7 spring 90' tends to rotate arm 86 in a clockwise direction and thereby pivot the edge 90 of the arm into braking engagement with the peripheral edge of disc 84.

As will be described later the reel is arranged to have the free running spool when brake arm 86 is in braking engagement with disc 84. In order to prevent backlash when stripping off line from the free running spool I have found it desirable to provide an additional brake which produces a drag on the spool. This auxiliary brake comprises a brake arm 94 which is pivoted by a pin 95 between a pair of spaced ears 96 struck out from the supporting frame 10. Pin 95 is formed with an extension 97 having an adjusting knob 99 at the end thereof. The portion of pin 95 supporting arm 94 is in the form of an eccentric cam 101. Brake arm 94 is pivoted between its ends on an axis parallel to the plane of frame 10 and is provided at one end with a pad member 98 projecting through frame 10 which is arranged to bear against the inner side wall 100 of the spool when the brake is in the engaged position. Pad 98 is yieldably urged to a position out of engagement with the spool by a coiled compression spring 102 which is positioned and acts between frame 10 and arm 94. At its other end brake arm 94 is struck upwardly so as to provide a camming surface 104. It will be noted that the pressure with which pad 98 bears against the spool may be adjusted by turning knob 99 so as to move arm 94 further from or closer to the spool.

Both brakes are arranged to be controlled by a single brake lever control arm 106 pivoted on frame 10 by a screw 108. Brake lever 106 is provided with a lug 110 which in one position of the lever engages cam 104 to pivot pad 98 into engagement with the inner wall 100 of the spool. Cam 104 is preferably designed so that in the engaged position only a slight braking pressure sufficient to prevent backlash, is applied by pad 98 to the spool. When brake lever 106 is pivoted to its other extreme position shown in dotted lines 107 in Figure 7 lug 110 engages a boss 112 on the end of brake arm 86 to pivot the braking edge 90 out of engagement with the peripheral edge of disc 84. Brake arms 94 and 86 are positioned relative to each other on frame 10 so that brake lever 106 can be pivoted to an intermediate position shown in dotted lines 109 in Figure 7 wherein lug 110 is free of both brake arms. In this intermediate position of lever 106 brake arm 86 is biased by spring 90' to the engaged position so as to prevent rotation of the main shaft 52 and brake arm 94 is biased by spring 102 to the released position free of wall 100 so as to permit free rotation of the spool. Lever 106 is normally biased by a leaf spring 113 so as to engage lug 110 with cam 104 and thereby apply a drag on the spool.

In order to effect a coupling between main shaft 52 and shaft 24 on which the spool is mounted I have provided a novel clutch arrangement which I will now describe. The clutch assembly comprises a carrier member 114 which is supported on shaft 52 and keyed thereto as by a pin 116 projecting through the shaft. Carrier 114 is provided with a pair of axially spaced flanges 118 between which are pivoted a pair of dogs 120. Dogs 120 are pivoted on diametrically opposed axes and are provided at their outer ends with arcuate camming shoes 122 which, when the dogs are pivoted outwardly on carrier 114, engage with the inner cylindrical surface 124 of drum member 126 which is fixed to the inner end of shaft 24. Each dog 120 is biased to an inwardly pivoted position out of engagement with drum 126 by means of light spiral springs 128 which are connected at one end to the dog and at the other end to the hub of the carrier 114. Dogs 120 are thus arranged to be pivoted outwardly by centrifugal force into engagement with drum 126 so as to effect a coupling between main shaft 52 and the spool shaft 24. Springs 128 are selected such that they are only sufficient to hold dogs 120 out of engagement with drum 126 when main shaft 52 is at rest. As soon as shaft 52 begins to rotate under the influence of spring 44, the centrifugal force on dogs 120 overcomes the tension of springs 128 and pivots the dogs to the engaged position. Although I have shown braking disc 84 and carrier 114 formed as separate pieces keyed on shaft 52, it will be appreciated that these members may be, if desired machined integrally with the main shaft.

The operation of my reel is as follows:

When it is desired to cast or "shoot the line" with spring 44 in the wound condition, lever 106 is pivoted to the previously described intermediate position where lug 110 is free of both cam 104 and lug 112. With the brake lever in this position the main shaft 52 is locked against rotation and spool 28 is in the free running condition. If then the rod is whipped, as in casting, the line unreels freely from the spool. After sufficient line has been stripped in this manner, brake lever 106 is released to apply a sufficient drag on the spool through arm 94 and pad 98 to prevent backlash. The line may then be reeled in either manually by means of turning knob 130 on the spool or automatically by pulling brake lever 106 up to the position indicated by dotted lines 107 in Figure 7 in which position lug 110 engages boss 112 on brake arm 86 and pivots the brake arm in a counterclockwise direction as viewed in Figure 7 so as to move the braking edge 90 out of engagement with the peripheral edge of brake disc 84. When disc 84 is released in this manner spring 44 serves to rotate shaft 52 through the gear train previously described. As soon as shaft 52 begins to rotate dogs 20 are pivoted by means of the centrifugal force of the rotating shaft outwardly into engagement with drum 126. Since drum 126 is fixed to the inner end of shaft 24 which is in turn keyed to hub 26, it will be appreciated that spool 28, hub 26, shaft 24, drum 126, dogs 120, together with gear 82 and shaft 52 will rotate as a unit.

When in reeling in line, spring 42 becomes completely unwound, it may be rewound by simply releasing brake lever 106 and turning cap 66. Since cap 66 is fixed on casing 42, the outer end of spring 44 will revolve with cap 42 while the inner end of the spring remains stationary with sleeve 46. It will also be appreciated that spring 44 may be wound by stripping line with lever 106 shifted to the position wherein brake disc 84 is released. As soon as brake disc 84 is released dogs 120 are pivoted to the engaged position and as previously described spool 28 rotates with shaft 52. Therefore, when the line is stripped in this manner the inner end of the spring revolves with the spool while the outer end remains stationary with cap 66. If the line stripping is continued after the spring is fully wound, spring washer 32 simply allows the spool to slip on hub 26.

It will thus be seen that I have provided a fishing reel which can be operated either manually or automatically as desired. By connecting the line spool with the spring motor by means of a clutch and by braking on the drive shaft on the side of the clutch adjacent the spring motor, it will be appreciated that a free running spool is provided while the spring motor is in either the wound or unwound condition. It will also be noted that by providing a single brake lever in combination with the self-actuating clutch which connects the spool with the motor, the entire operation of the reel may be controlled by means of the single brake lever.

I claim:

1. A brake mechanism for an automatic fishing reel of the type having a spring motor, a main drive shaft connected with said motor for rotation, a line spool rotatable relative to said drive shaft, and a clutch for connecting and disconnecting said spool and said main drive shaft, comprising a pair of brake members operable one on said main drive shaft and the other on said spool, said main shaft brake member being arranged to restrain rotation of said main shaft under the influence of said motor, said other brake member being arranged to prevent rotation of said spool when said clutch is disengaged, said first brake member being normally arranged in braking engagement with said main drive shaft, means biasing said second brake member out of braking engagement with said spool, and a brake lever shiftable into engagement with either of said brake members.

2. The combination set forth in claim 1 wherein said brake lever is shiftable from a first position in engagement with the brake member for said line spool to a second position in engagement with the braking member for said main shaft and to a third position out of engagement with both of said braking members wherein said main shaft is restrained from rotating and said line spool is free to rotate.

3. The combination as set forth in claim 1 including means normally biasing said brake lever into engagement with the brake member for the line spool, said brake lever biasing means being sufficient to overcome the biasing means on said spool brake so as to shift said spool brake to its braking position, whereby both of said brake members are normally in the braking position.

4. The combination as set forth in claim 3 wherein said braking lever is shiftable to a neutral position between said brake engaging positions and free of said brake members, whereby said lever may be progressively actuated from a normal position engaged with the brake member for the spool and free of the brake member for the driving shaft to an intermediate position free of both of said brake members and then to a third position in engagement with the brake member for said shaft and free of the brake member for said spool.

FLOYD C. KING.

REFERENCES CITED

The following references are of record in the file of this patent:

UNITED STATES PATENTS

| Number | Name | Date |
|---|---|---|
| 1,444,560 | Schmid | Feb. 6, 1923 |
| 1,909,621 | Maury | May 16, 1933 |
| 2,026,665 | Beasley | Jan. 7, 1936 |
| 2,145,474 | Burdick | Jan. 31, 1939 |
| 2,148,185 | Blocker | Feb. 21, 1939 |
| 2,262,671 | Fanshier | Nov. 11, 1941 |
| 2,474,541 | Maury | June 28, 1949 |